VOLTAGE COMPARATOR INCORPORATING VOLTAGE RESPONSIVE SWITCHABLE TUNNEL DIODE IMPEDANCE MEANS

Filed Sept. 20, 1962

INVENTORS.
JOSEPH F. MARTIN
FRANK NIERTIT
BY
George W. Killian
AGENT

United States Patent Office 3,231,756

Patented Jan. 25, 1966

3,231,756

VOLTAGE COMPARATOR INCORPORATING VOLTAGE RESPONSIVE SWITCHABLE TUNNEL DIODE IMPEDANCE MEANS

Joseph F. Martin, Webster, and Frank Niertit, Rochester, N.Y., assignors to General Dynamics Corporation, Rochester, N.Y., a corporation of Delaware Filed Sept. 20, 1962, Ser. No. 225,078
1 Claim. (Cl. 307—88.5)

This invention relates in general to comparators and, more particularly, to a comparator for producing an output signal only when the instantaneous potential difference between two signals exceeds a predetermined magnitude in a predetermined sense.

The invention herein disclosed is suitable for a wide range of applications wherein it is necessary to compare two potentials and provide a signal indicative of said two potentials having a potential difference exceeding a predetermined magnitude. For example, in time division multiplex telephone systems it is necessary to transfer information from a send line circuit to a receive line circuit via a highway. The signal to be transferred is an amplitude modulated signal which occurs in a given time slot of a repetitive time frame. This invention teaches means for comparing the amplitude modulated signal with a repetitive ramp signal, and for producing an output signal only when the amplitude modulated signal and the ramp signal differ by a predetermined magnitude and in a predetermined sense. A signal indicative of the time at which the output signal occurred is then transferred from the send line circuit to the receive line circuit via the highway. A synchronized ramp signal at the receive line circuit is caused to reproduce the amplitude modulated signal to the receive line circuit. Although the pulse repetition rate of the ramp signals at the send and receive ends are synchronized, the ramp signal at the receive end may have a greater amplitude, thereby providing amplification of the modulated signal. In this application, the ramp signal may have a pulse repetition rate of once per fifty of the cited time frames and a signal is transmitted from the send to the receive line circuit via the highway only the first time, per cycle of the ramp signal, that the magnitude of the amplitude modulated time slot signal differs from the ramp signal by the predetermined magnitude and in the predetermined sense. The means for permitting the single transmission per cycle of the ramp signal does not form a part of this invention and, therefore, is not shown herein.

Other applications for this invention will readily occur to those skilled in the art.

It is the general object of this invention to provide a new and improved comparator.

It is a more particular object of this invention to provide a comparator for producing an output signal only when the instantaneous potential difference between two signal sources is in a predetermined sense and exceeds a predetermined magnitude.

It is another object of this invention to provide a comparator which produces no output signal and a maximum output signal when the potential difference between two signal sources is below and above, respectively, a predetermined threshold.

It is another object of this invention to provide a comparator which can be turned off and on at a rapid rate as the potential difference between two signal sources varies above and below a predetermined threshold potential.

In accordance with the present invention, there is provided a transistor having one input circuit connected to the emitter and another input circuit connected to the base electrode. A tunnel diode is included in a circuit connecting the two input circuits to keep the transistor turned off until the potential across the tunnel diode exceeds the peak point potential of the tunnel diode, thereby causing it to fire and turn on the transistor to produce an output signal.

Further objects and advantages of the invention will become apparent as the following description proceeds, and features of novelty which characterize the invention will be pointed out in particularity in the claim annexed to and forming a part of this specification.

For a better understanding of the invention, reference may be had to the accompanying drawings in which.

It is to be understood that only the details necessary to understand the invention have been shown. For example, the means for generating the input signal have not been illustrated as they do not form a part of this invention.

Figure 1:
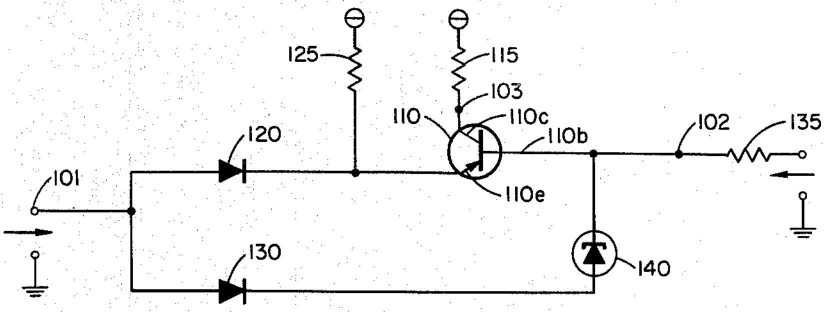
FIG. 1 shows a circuit diagram of the preferred embodiment of the invention.

It is believed that the operation of the circuit of FIG. 1 can best be understood when examined in combination with the following detailed description. The circuit comprises a transistor 110 having a base electrode 110*b*, an emitter electrode 110*e*, and a collector electrode 110*c*. A first input signal may be connected to point 101 for connection to emitter 110*e* through diode 120. Diodes 120 and 130 are unidirectional conducting devices having characteristic curves similar to curves 120 and 130 of FIGS. 2 and 3, respectively. That is, as the voltage across either of the diodes is increased, the current therethrough rises slowly until the linear portion of the characteristic curve is reached, whereupon the current rises rapidly for small increases in potential. The application of a reverse potential, however, does not cause a significant current to flow through the diodes, provided a predetermined maximum reverse potential is not exceeded, which would tend to damage the diode. Phrased differently, the diodes 120 and 130 exhibit a low resistance to current in one direction and a high resistance to current in the opposite direction. Diode 120 is of a type which has a substantially greater forward resistance than diode 130. Resistor 125 is employed to bias diode 120 so that the voltage drop across it varies very little with changes in current through it. For example, diode 120 may be biased to point *c* on curve 120 of FIG. 2.

Figure 2:
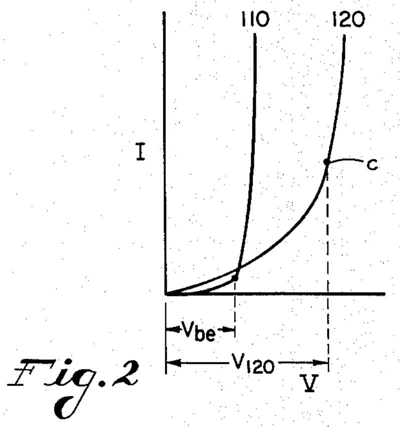
FIGS. 2 and 3 show characteristic curves of some of the elements used in the circuit of FIG. 1.

Transistor 110 is illustrated as a PNP transistor and, therefore, before conduction can take place, the base 110*b* must be negative with respect to the emitter 110*e*. FIG. 2 illustrates at 110 a typical base curve for a transistor wherein the X-axis represents the potential difference between the base electrode 110*b* and the emitter electrode 110*e*; while the Y-axis represents the collector current. As may be seen, the curve is similar in shape to the curve for the diodes and at potentials below $V_{be}$ the collector current will be very small and any potential increase above $V_{be}$ will produce a large increase in collector current. The present invention provides a circuit which keeps the collector current of the transistor 110 at zero when the instantaneous potential difference of first and second input signals is below a predetermined magnitude and which saturates the transistor 110 so that the collector current is substantially its maximum value when the instantaneous potential difference of the first and second input signals is greater than said predetermined magnitude. That is, the transistor 110 is either held cut off or turned on and saturated.

Figure 4:
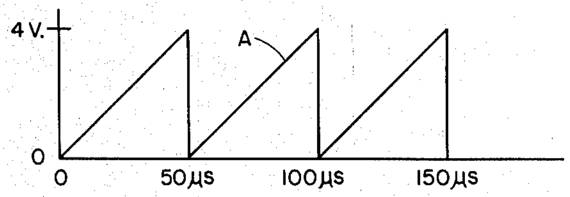
FIGS. 4 and 5 show typical input signals.
Figure 5:
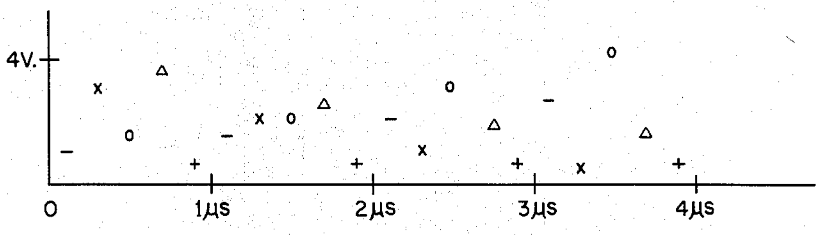

The input potential applied to point 101 may take any convenient form. In one test model, a sawtooth wave, such as A of FIG. 4, having a potential of approximately four volts peak-to-peak and a pulse repetition rate of 50 microseconds was used. A second input signal having a source impedance 135 may be connected to point 102 for connection to the base **110*b* of transistor 110. In the test model referred to, the second input signal comprised time slot pulses in a repetitive time frame. Each time frame had a period of one microsecond and was divided into five time slots. Thus, each cycle of the ramp signal had a duration of fifty time frames. FIG. 5 illustrates a few time frames of the input signals at point 102; the dashes represent the samples of the amplitude modulated pulses in time slot 1; the X's represent pulses in time slot 2; while the circles, triangles, and plus symbols represent the samples of the amplitude modulated pulses in time slots 3, 4 and 5**, respectively. Obviously, FIGS. 4 and 5 are drawn with different time axis scales.

As shown in FIG. 1, the input points 101 and 102 are connected together by a circuit including diode 130 and tunnel diode 140. Tunnel diode 140 has a characteristic curve as shown at 140 in FIG. 3. As may be seen from the characteristic curve, a tunnel diode presents a rather low forward resistance until the current therethrough exceeds a threshold point, known as the peak point, and indicated as *a* on curve 140. When the peak point is reached, any further increase in voltage across the tunnel diode will cause a rapid increase in the resistance of the tunnel diode and its operating point will suddenly shift from point *a* through its unstable state to a stable operating point, such as *b*. Additional and more detailed information concerning tunnel diodes and their characteristics is readily available in trade journals as well as catalogues and sales brochures of the various manufacturers. For example, reference may be made to General Electric's Tunnel Diode Manual, 1961 edition.

As stated, the negative potential connected to resistor 125 will bias diode 120 to point *c* on curve 120 of FIG. 2. Obviously, the transistor 110 cannot be turned on until the potential difference between points 101 and 102 exceeds the potential $V_{120}$, the bias of diode 120, in the proper sense. That is, the potential at point 102 must be more negative with respect to the potential at point 101 by an amount exceeding the magnitude of potential $V_{120}$. Furthermore, since it is desired to have the transistor 110 be either cut off, or saturated, it is necessary that the circuit include means for preventing the base from becoming negative with respect to the emitter without at the same time being driven negative by a magnitude exceeding the potential $V_{be}$, which as illustrated in FIG. 2, is the potential which must be exceeded to saturate the transistor 110.

Since the second input potential varies and at any given instant may be positive, negative, or equal to the instantaneous potential of the first input signal, all three conditions must be examined.

At an instant when the second input potential is positive with respect to the input signal at point 101, the diode 130 will be reverse biased and the PNP transistor 110 will be cut off. That is, when the second input potential is positive with respect to the first input potential, the base **110*b* of transistor 110 will be positive with respect to the emitter 110*e*** and the transistor will be held cut off.

At an instant when the instantaneous potentials of the first and second input signals are equal, there will be no bias on diode 130 and tunnel diode 140. However, the bias current through resistor 125 will create a potential drop across diode 120, thereby making the emitter **110*e* slightly negative with respect to the input potential and, therefore, transistor 110** will be held cut off.

At the instant when the instantaneous input potential of the second input signal becomes negative with respect to the signal at point 101, the circuit comprising diode 130 and tunnel diode 140 connecting the base electrode **110*b* and point 101 must be considered in more detail. Current from the signal source connected to point 101 will pass through the series circuit comprising diode 130 and tunnel diode 140 to the lower potential signal source connected to point 102 and including the internal resistance 135 of the second signal source. Since the diode 130 and tunnel diode 140 will exhibit a minimum resistance to the flow of current when the potential difference between the two input signals is relatively small, the base 110*b* will be at substantially the same potential as point 101. This results in the potential drop across diode 130 plus the potential drop across tunnel diode 140 being less than the drop across diode 120 and, accordingly, the transistor 110** is maintained cut off.

Figure 3:
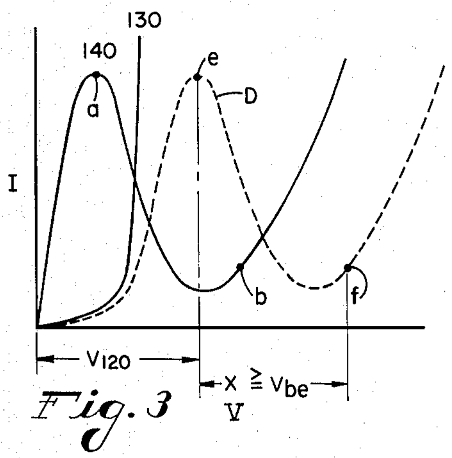

The characteristic curves for elements 130 and 140 are shown in FIGS. 2 and 3 as curves 130 and 140, respectively. As may be seen and as already mentioned, the forward resistance of the tunnel diode 140 suddenly increases when the potential drop across it exceeds the potential difference at the peak point *a*. Curve D of FIG. 3 is a composite curve showing the combined potential drop across diode 130 and tunnel diode 140. Thus, when the second input potential becomes more negative, thereby increasing the potential difference between the two input signals, the potential at point 102 will become more negative and the series current through diode 130 and tunnel diode 140 and the internal resistance 135 of the second signal source will increase. The low forward resistance of diode 130 and tunnel diode 140 will maintain point 102 at a potential which is positive with respect to the emitter **110*e* until finally the potential difference between points 101 and 102 exceeds the potential $V_{120}$. The curves of FIGS. 2 and 3 are drawn to the same X-axis scale and, therefore, as may be seen by comparing the curves 120** and D of FIGS. 2 and 3, respectively, when the potential $V_{120}$ is reached, the composite curve D is at point *e* and the tunnel diode 140 is biased to its peak point and any further increase in the magnitude of the potential difference between the two input signals will trigger the tunnel diode 140 through an unstable state and cause it to suddenly exhibit a high resistance, thereby greatly reducing the current through the series circuit comprising diode 130, tunnel diode 140, and the internal resistance 135 of the second input signal. Accordingly, the potential drop across the diode 130 and tunnel diode 140 will be materially increased and point 102 will be driven more negative by an amount, *x*, which will equal, or exceed, the potential $V_{be}$. That is, the sudden change in the tunnel diode which results from exceeding its peak point potential will cause a change in the potential at point 102 which will cause the transistor 110 to be switched from its cutoff state to its saturated state.

The diode 130 prevents the tunnel diode 140 from becoming forward biased when the input potential at point 101 is negative with respect to the input potential at point 102. Resistor 115 is used to limit the collector current when transistor 110 is turned on. An output signal is available at point 103 when the transistor 110 is turned on.

While there has been shown and described what is considered at present to be the preferred embodiment of the invention, modifications thereto will readily occur to those skilled in the art. For example, the PNP transistor 110 could be replaced by an NPN transistor and other suitable modifications made in polarities and connections, or the input signals could have different shapes and repetition rates from those illustrated in FIGS. 4 and 5. It is not desired, therefore, that the invention be limited to the embodiment shown and described, and it is intended to cover in the appended claim all such modifications as fall within the true spirit and scope of the invention.

What is claimed is:

A voltage comparator for comparing two independently varying potential signals from two different potential sources, said comparator comprising a control device having a current collecting electrode connected to a point of fixed operating potential through a first resistance, a current emitting electrode and a control electrode for producing a saturation current through said device in response to the potential of said control electrode with respect to the potential of said current emitting electrode having a given polarity and at least a first given magnitude and for maintaining said device cut off in response to the potential of said control electrode with respect to said current emitting electrode having less than a second given magnitude; first means for biasing said control device including a first unidirectional conducting device poled to be conductive when said control electrode has said given polarity with respect to said current emitting electrode connecting one of said varying potential sources to said current emitting electrode, and a second resistance connecting said current emitting electrode to said point of fixed operating potential; and third means including a third resistance of a given value connecting the other one of said varying potential sources to said control electrode, and a serially connected tunnel diode and second unidirectionally conducting device connecting said one of said varying potential sources to said control electrode, said second unidirectionally conducting device having a relatively low forward resistance characteristic with respect to the forward resistance characteristic of said first unidirectional conducting device and poled to be conductive when said control electrode has said given polarity with respect to said current emitting electrode, said tunnel diode switching from a resistance value which is low to one which is high with respect to said given value of said third resistance in response to the potential difference thereacross reaching a critical magnitude, said critical magnitude being no greater than said second given magnitude, the potential of said control electrode with respect to said current emitting electrode being at least equal to said first given magnitude in response to said tunnel diode being switched to its high resistance value.

References Cited by the Examiner

UNITED STATES PATENTS

| | | | |
|---|---|---|---|
| 2,872,596 | 2/1959 | Day et al. | 307—88.5 |
| 2,982,887 | 5/1961 | Seeley | 328—147 |
| 3,033,996 | 5/1962 | Atherton | 307—88.5 |
| 3,049,631 | 8/1962 | Taylor | 307—88.5 |
| 3,052,852 | 9/1962 | Logan | 307—88.5 |
| 3,098,162 | 7/1963 | Fischman et al. | 307—88.5 |
| 3,151,289 | 9/1964 | Harpley | 307—88.5 |

OTHER REFERENCES

Amodei: "Binary Counter," RCA Technical Notes No. 489, September 1961 (pages 1 and 2 relied on).

DAVID J. GALVIN, *Primary Examiner.*

JOHN W. HUCKERT, ARTHUR GAUSS, *Examiners.*